(12) United States Patent
Ferguson (10) Patent No.: US 8,297,148 B1
(45) Date of Patent: Oct. 30, 2012

(54) MODULAR ADJUSTABLE HANDLEBAR KIT

(76) Inventor: Thomas Ferguson, Glasgow, KY (US)

( * ) Notice: Subject to any disclaimer, the term of this patent is extended or adjusted under 35 U.S.C. 154(b) by 584 days.

(21) Appl. No.: 12/507,110

(22) Filed: Jul. 22, 2009

Related U.S. Application Data

(63) Continuation-in-part of application No. 10/930,567, filed on Aug. 30, 2004, now abandoned.

(51) Int. Cl.
*B62K 21/16* (2006.01)
(52) U.S. Cl. .................................. 74/551.4
(58) Field of Classification Search ............... 74/551.1, 74/551.2, 551.3, 551.4, 551.5; 403/52, 83, 403/102, 110, 408.1
See application file for complete search history.

(56) References Cited

U.S. PATENT DOCUMENTS

| | | | | |
|---|---|---|---|---|
| 613,970 A | * | 11/1898 | Christy | 403/108 |
| 3,215,459 A | * | 11/1965 | Baldwin | 403/13 |
| 4,417,745 A | * | 11/1983 | Shomo | 280/287 |
| 5,144,859 A | * | 9/1992 | Malone | 74/551.3 |
| 5,201,243 A | * | 4/1993 | Schneider | 74/551.1 |
| 6,048,294 A | * | 4/2000 | Formanek | 482/142 |

* cited by examiner

*Primary Examiner* — Vicky Johnson
(74) *Attorney, Agent, or Firm* — Laura M. Hagan; Kerrick Stivers Coyle (57) ABSTRACT

The Modular Adjustable Handlebar Kit contains a center mounting segment and linking units of varying degrees of angles, curves and/or segments with differing shapes both radius and straight and/or compounded curves with straights. Each of the linking units have a male and female end and are attached to adjoining linking units and center mounting segment via means of a plurality of aligning openings spaced about the circumference of each end of the linking units and a securing mechanism. The openings on the male end of the linking units form inner and outer rows, in which the openings are offset from each other. The female ends of the linking units have front and rear openings which are generally parallel to each other. The securing mechanism may be a clamping device and may utilize a dowel which extends through the aligned openings on the adjoined linking units. The clamping device is then secured to prevent disengagement of the pin.

6 Claims, 14 Drawing Sheets

MODULAR ADJUSTABLE HANDLEBAR KIT

This application is a continuation-in-part application of and claims priority to U.S. patent application Ser. No. 10/930,567 filed on Aug. 30, 2004.

FIELD OF THE INVENTION

The modular adjustable handlebar kit relates to the technical field of motor or pedal-powered two-, three- or four-wheeled cycles or vehicles, motorized cycles and/or motorcycles, parts and accessories, with particular emphasis to a multi-angled, circular rotation or position and/or the security locking of the handlebar units and handlebar assemblies.

SUMMARY OF THE INVENTION

Cyclists, due to differences in physical build, height, weight, length of their arms, legs and torso, have different needs for the position and configuration of the handlebar assemblies. In addition, each cyclist has a different handlebar-positioning requirement based on the type and style of riding they do. Additionally, a rider of a motorized or non-motorized cycle may often wish to change the position of the handlebar in extended rides to reduce and relieve stress and fatigue.

While a number of various styles of handlebar assemblies of different fixed lengths, curves and angles are available, very few are capable of modification into a different position. The prior art handlebar units which can be modified are typically restricted to rotation toward the cyclist or away from the cyclist or in an upward or downward vertical position. Additionally, none of the prior art handlebars have a locking mechanism which secures the individual components into place and thus prevents the components from coming disengaged, particularly when in use with a vehicle which is capable of high speeds, such as a motorcycle.

The Modular Adjustable Handlebar Kit utilizes a center-mounting segment with a first and second end and connects to the center post of the vehicle. Each of the first and second ends has holes placed around its circumference. Linking units are used to compose the desired handlebar shape and are comprised of various sizes, curves and angles. Each linking unit has a first female receiving end with holes placed around the circumference and a second male insertion end with holes placed around the circumference and a diameter smaller than the first end. The second end fits snugly within the first end of an adjacent linking unit. Within the second end of each of the linking units is a spring loaded locking pin mechanism. Linking units are mated by inserting the second end of one linking unit into the first end of another linking unit. When the linking units are connected, the holes on the mating ends are aligned. The spring loaded locking pin mechanism is comprised of spring loaded pins which retract and expand into the aligned holes. A sleeve device is slipped over the mating ends of the connected linking units by depressing the spring loaded pins, until the pins retract into pin indentations located on the inside wall of the sleeve. This places the locking mechanism into a locked mode. The spring loaded locking mechanism is unlocked by using a customer specific tool which is designed to fit into an opening located on the outer wall of the sleeve device. The openings on the sleeve device are located 180 degrees apart and allow the customer specific tool to access the spring loaded pins by pushing in and depressing the spring loaded pins until they clear the pin indentations located on the inside of the sleeve. Once the two spring loaded pins have been depressed from the pin indentations, the sleeve may be removed by sliding it away from the mating point of the joined linking units.

Once mated to an adjacent center mounting segment or a linking unit, the individual linking units may be rotated 360 degrees. Once the desired angle or position of the handlebar unit or assembly is achieved, the spring loaded pins which are placed within the inner diameter of the second end of the linking units expand into the aligned holes lining the circumferences of the first and second ends of the linking units, thus retaining the angle of rotation.

The alternative embodiment of the present invention also provides a variety of adjustment positions now shown in the prior art. These adjustments can be easily obtained without the use of a customer specific tool, but rather with ordinary tools available.

The present invention allows either or both left and right portions of the handlebars to be adjusted in a multitude of styles and designs. Thus, a cyclist can adjust the geometric position to his or her own physical characteristics and re-adjust as the riding conditions change or if a different style is desired. Either the right or the left handlebar unit may be independently adjusted or re-adjusted and locked in position, to the comfort and safety of the cyclist.

The directional rotation of the linking units or the entire handlebar assembly in a position far forward protruding over the front of the cycle or vehicle or a similar position restricts the steering of the motorcycle from the straight steering condition. Once the handlebar unit is locked into this restricted position, it serves to act as an anti-theft or unauthorized movement deterrent for a cycle or vehicle. In addition, the independent movement in multiple directions allows the cyclist to relocate either or both handlebar units to accommodate manual movement of the cycle through narrow passageways or confined areas when transporting or storing.

DETAILED DESCRIPTION OF THE DRAWINGS

Figure 1:
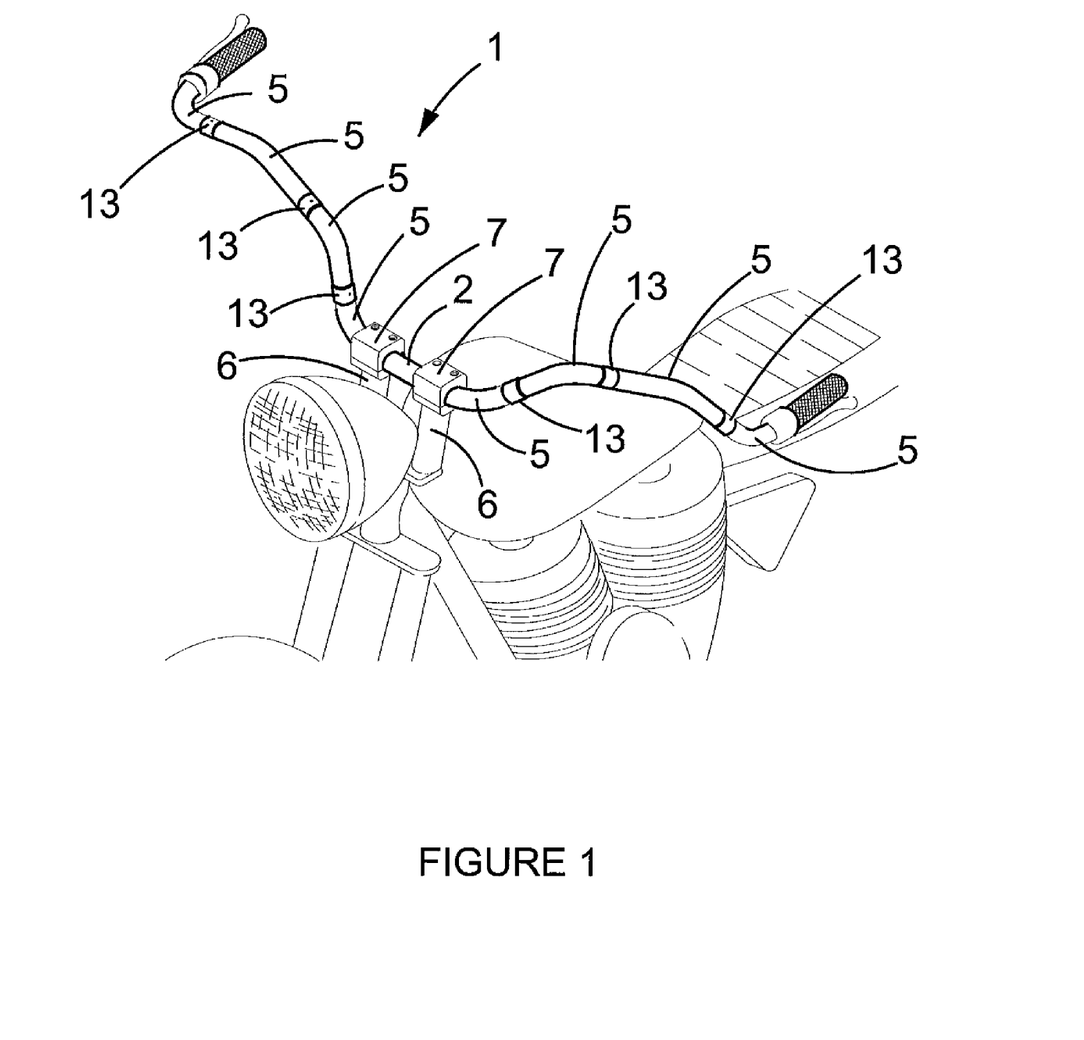
FIG. 1 is a perspective view of the present invention placed on a motorcycle.
Figure 2A:
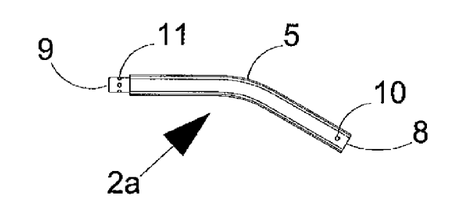
FIG. 2a-2i are side views of several variations of linking units.
Figure 2B:
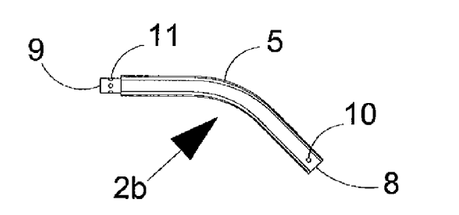
Figures 2C, 2D, 2E, 2F, 2G, 2H, 2I:
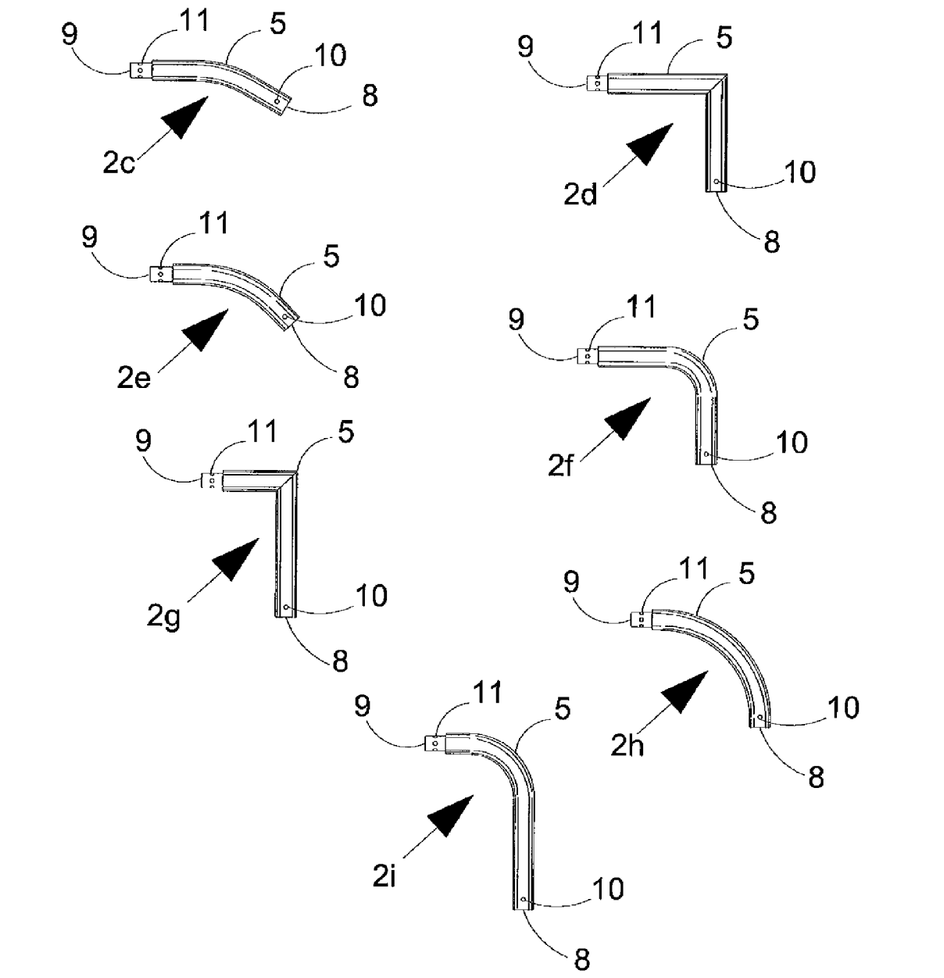
Figure 3:
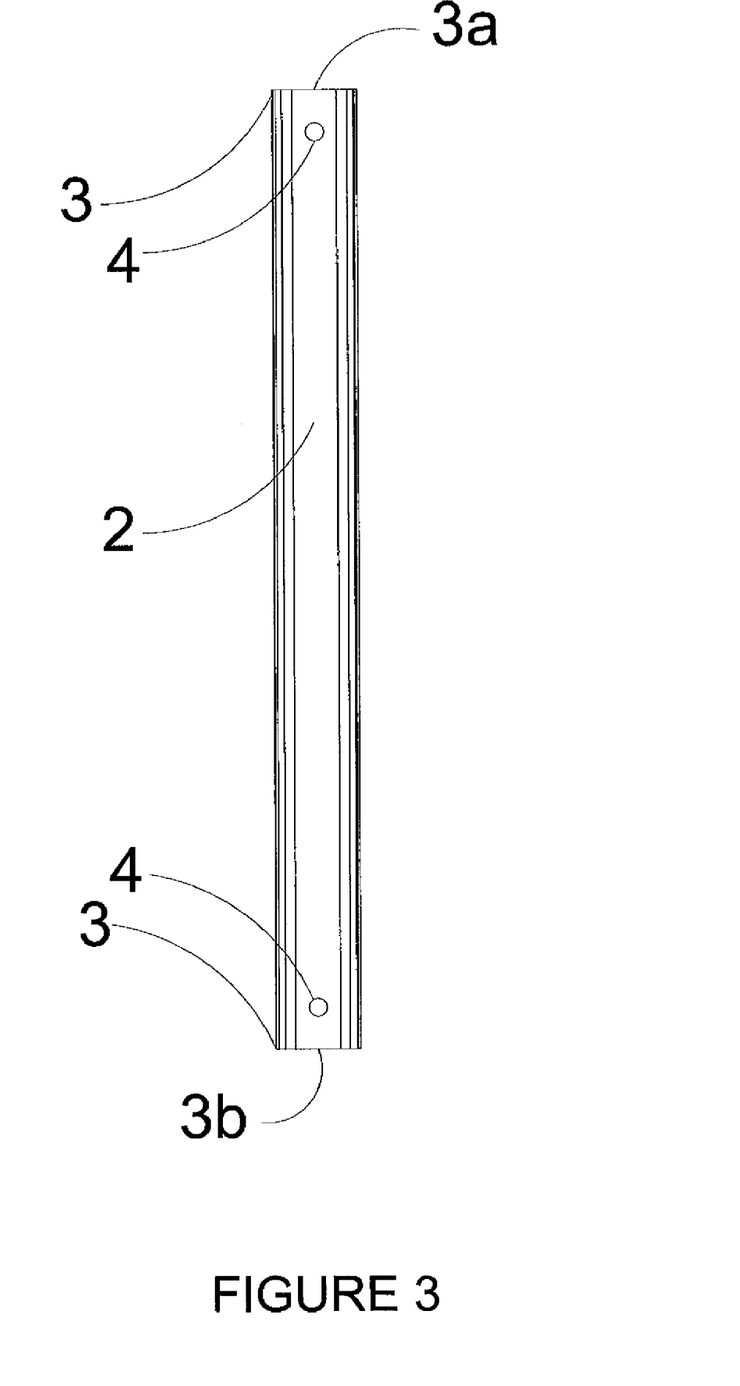
FIG. 3 is a side view of a center mounting unit.

The modular adjustable handlebar kit has a center mounting segment 2 and multiple linking units 5 which fit together to form the desired handlebar shape. FIG. 3 shows the center-mounting segment 2, which is typically cylindrical in shape with identical first and second ends 3a, 3b. Both the first and second ends 3a, 3b are female receiving ends and have more than one hole 4 placed around the outer circumference of each end 3a, 3b. The center mounting segment 2 attaches to the steering column or posts 6 on a motorcycle or other cycle usually by loosening a bolt and/or other fastening device 7 with the proper wrench until the inner circular space is large enough to receive the center-mounting segment 2. Once the center-mounting segment 2 is inserted and centered from left to right, the steering column fastener 7 is tightened using the appropriate tool and to the appropriate tightening specification, furnished by the original equipment manufacturer of the steering column 6.

Upon mounting of the center mounting segment 2 to the steering column 6 of a vehicle, the first and second ends 3a, 3b each receives a linking unit 5, which is shown in FIGS. 2a-2i. Each linking unit 5 has a first female receiving end 8 which has at least two holes 10 placed around the outer circumference and a second male insertion end 9 which has a smaller circumference than the first end 8 and fits snugly within the first end 8 of another linking unit 5. The second end 9 also has at least two holes 11 placed around its outer circumference. The linking units 5 are assembled to create the desired handlebar shape for the user. The linking units 5 may be comprised of a variety of shapes, lengths, curves and angles, as is shown in FIGS. 2a-2i. This wide variation allows for numerous styles and designs of handlebars to be created with the modular adjustable handlebar kit 1.

Figure 4:
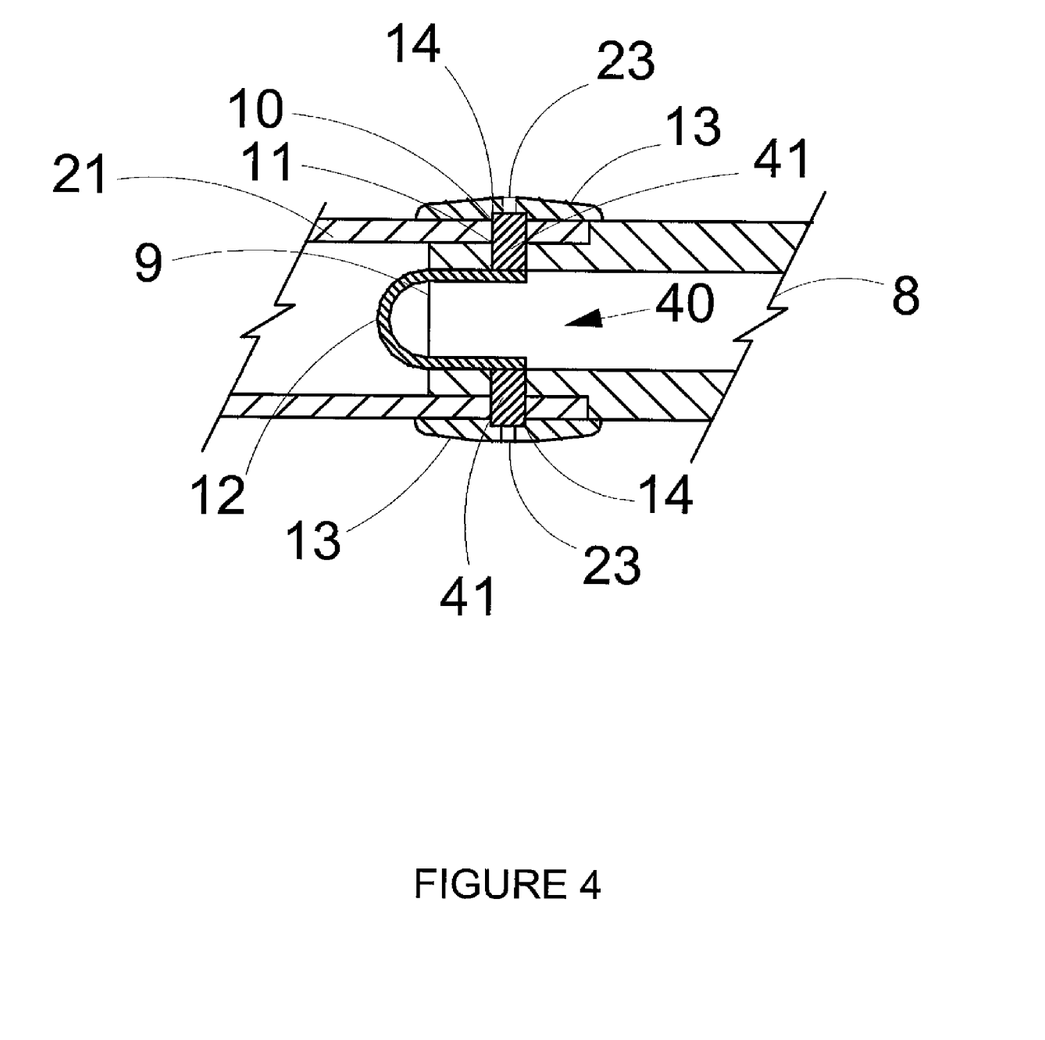
FIG. 4 is a side view of the locking mechanism of the present invention connecting two linking units together.

After the installation of the center mounting segment 2, any appropriate curved or straight linking units 5 may be installed and fastened. This is performed using any combination of curved or straight linking units 5 on either or both sides until the desired and safe modular handlebar 1 configuration is achieved. The center mounting segment 2 and the adjacent linking units 5 are attached to each other through means of a locking mechanism 40 located within the Second end 9 of each linking unit 5. FIG. 4 shows the locking mechanism 40 utilized in the preferred embodiment of the present invention. The center mounting segment 2 and the adjacent linking units 5 are mated by inserting the second end 9 of one linking unit 5 into the first end 8 of another linking unit 5 or the first of second end 3a, 3b of the center mounting segment 2. Spring loaded pins 41 held together by spring steel 12 mounted on the inner diameter of the second end 9 of each linking unit 5 are able to retract and expand into the aligned holes 4, 10, 11 located at the mating ends 8, 9 of the linking units 5 or the first or second end 3a, 3b of the center mounting segment 2.

Once a linking unit 5 is attached to the center mounting segment 2 or adjacent linking unit 5, the style of the handlebar can further be rotated to the radial angle by depressing the spring loaded pins 41 and rotating the desired linking unit until the holes 4, 10, 11 of the two mating units are in alignment. This connection is securely maintained by placing a sleeve device 13 over the mating point for the adjacent linking units 5 or center mounting segment 2. The spring loaded pins 41 are slightly depressed so as to allow the sleeve device 13 to be slipped over the second and first ends of the mating units 5 or segment 2. The sleeve device 13 is cylindrical with an inner and outer wall 21, 22 resembling a tube. Once the sleeve device 13 is centered over the mating ends 3a, 3b, 8, 9 of the adjacent linking units 5 or center mounting segment 2, the depressed spring loaded pins 41 are allowed to expand into pin indentations 14 located on the inside wall 21 of the sleeve device 13, placing the locking mechanism 40 into a locked mode.

Figure 5:
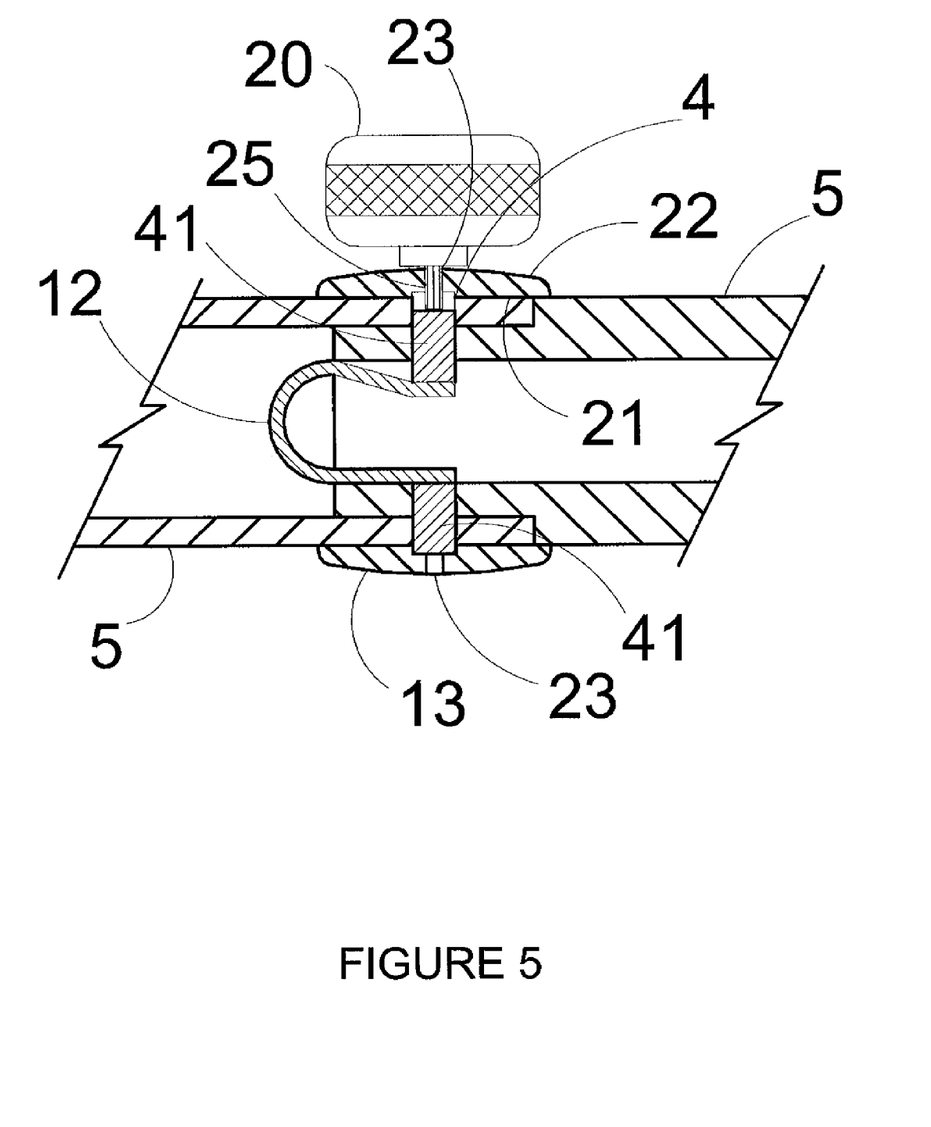
FIG. 5 is a side view of the customer specific tool unlocking the locking mechanism.

A customer specific key-like tool 20 is used to disengage the spring loaded pins 41 from the pin indentations 14 on the sleeve device 13. The tool 20 will have a key-shape portion 25, which will match an opening 23 on the outside wall 22 of the sleeve device. The opening 23 extends therethrough the sleeve device 13 to the pin indentations 14 on the inside wall 21 of the sleeve device 13. Upon insertion of the keyed portion 25 of the customer specific key-like tool 20, it depresses the spring loaded pins 41, causing deformation of the spring steel 12, allowing the spring loaded pins 41 to exit from the pin indentations 14 of the sleeve device 13, thus deformation of the spring steel 12 allowing the spring loaded pins 41 causing the spring steel 12 to be and allow for the sleeve device 13 to be removed from the mating linking units 5 and further to disengage the mating units 5 or segments 2.

The sleeve device 13 not only provides a locking mechanism 40 for the linking units 5, but it also provides protection from any individual inadvertently or purposefully tampering with the spring loaded pins 41 which hold the linking units 5 together. The center mounting segment 2 unit and the linking units 5 may be made of any suitable material, such as metal or metal alloys.

Figure 6:
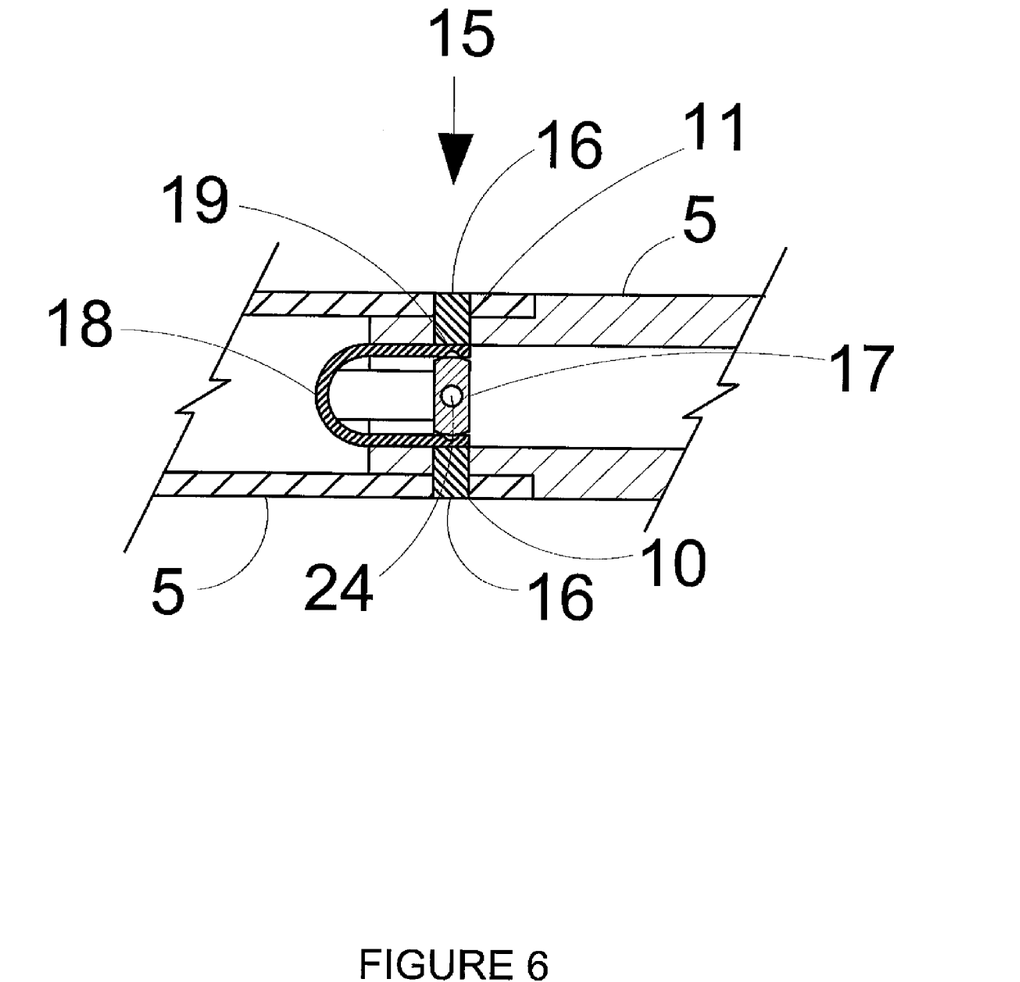
FIG. 6 is a side view of a first alternative embodiment of the locking mechanism in a locked position, locking two linking units together.

A first alternative locking mechanism 15 is shown in FIG. 6, which consists of spring loaded pins 16 connected by spring steel 18 and located in the second end 9 of each linking unit 5. The spring loaded pins 16 expand through the aligning holes 10, 11 of the mating adjacent linking units 5 or center mounting segment 2. A rotating actuating pin configuration 17 with an inward rotary movement ability is located between the spring loaded pins 16 and serves to restrict the spring loaded pins 16 inward travel and maintains the connection and restricted movement of the adjacent mating units 5 or segment 2. This mechanism is engaged by using a customer specific tool 20 inserted into a set of unused aligned holes 10, 11. The customer specific tool 20 has a keyed portion 25 which matches a mating depression 24 on the actuating pin 17. The keyed portion 25 is capable of rotating the actuating pin 17 until it hits the internal stop, which expands and locks the spring loaded pins 16 into two unused aligned holes 10, 11 located 180 degrees apart in the circumference of the linking units 5. There are two spring loaded ball-like devices 19 located on each end of the actuating pin 17 and between the two spring loaded pins 16. These spring loaded balls 19 expand against the spring loaded pins 16 holding the actuating pin 17 in place, keeping it from rotating.

Figure 7:
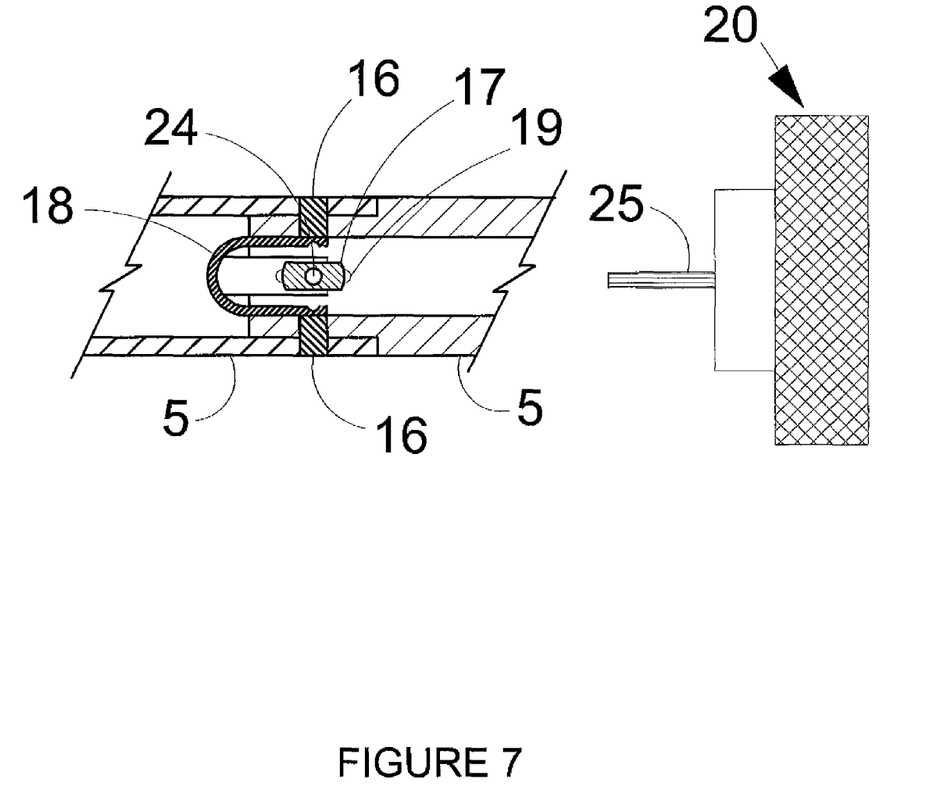
FIG. 7 is a side view of a first alternative embodiment of the locking mechanism in an unlocked position and the customer specific tool.

The spring loaded pins 16 on the locking mechanism 15 are disengaged from the lock mode by using the keyed portion 25 of the customer specific tool 20, through a set of unused aligned holes 8, 9 to rotate the actuating pin 17. FIG. 7 shows the actuating pin 17 in a disengaged position which allows the spring loaded pins 16 the ability to retract from the aligned holes 10, 11 of the mated linking units 5 for rotation or disengagement of the units 5 or segment 7. After the actuating pin 17 has been placed in a disengaged position, the spring loaded pins 16 may be depressed with the customer specific tool 20 or other device capable of fitting within the holes 4, 10, 11 on the first end 8 of linking unit 5 or first or second end 3a, 3b of the center mounting segment 2. This depression of the spring loaded pins 16 causes a deformation of the spring steel 18 allowing the spring loaded pins 16 to exit the aligned holes 4, 10, 11 and the mating units 5 or segments 2 to be disengaged.

The spring loaded pins 16 are locked into the aligning holes by actuating either a rotary mechanism or a linear mechanism, with an in or out movement. By rotating the actuating pin 17, the movement of the spring loaded pins 16 is prevented, thus locking the units 5 and segment 2 in place until it is desired to rotate the unit 5 or segment 2 or remove it for configuration changes. An additional configuration of this first alternative locking mechanism 15 may be, but is not limited to, an eccentric cam, offset shape, pin bump and/or shape that, when actuated inward or pulled outward and inserted between the spring loaded pin devices 16, would restrict the spring loaded pins 16 from being depressed and restrict the linking units 5 from being rotated or pulled apart.

Figure 8:
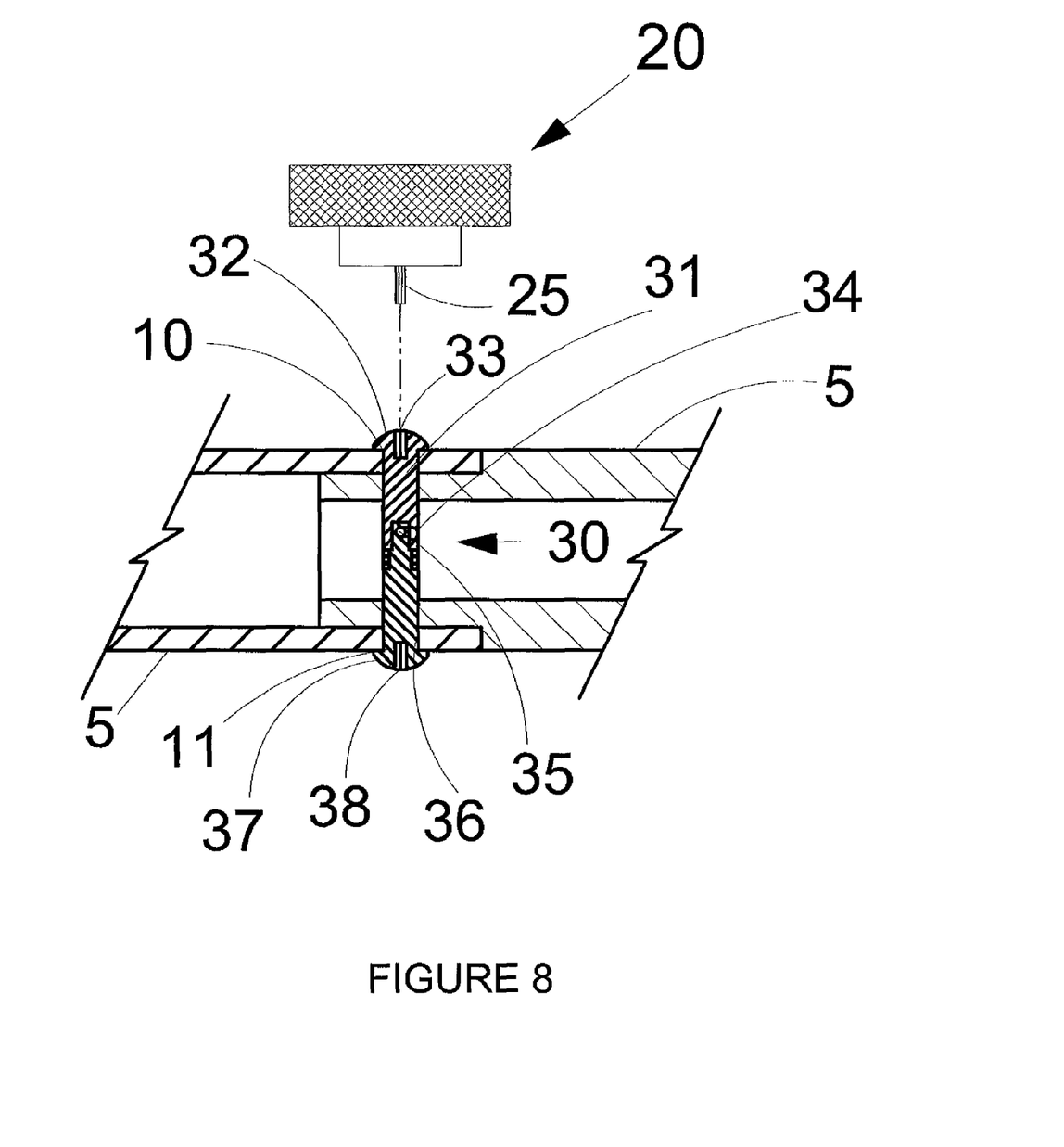
FIG. 8 is a side view of a second alternative embodiment of the locking mechanism, locking two linking units together.

Another second alternative locking mechanism 30 is shown in FIG. 8, which consists of two plug halves 31 and 36 that may be inserted into any two aligned unplugged holes 4, 10, 11 each adjacent to the other 180 degrees apart, surrounding the first and second ends 3a, 3b, 8, 9 of two mating linking units 5 or center mounting segment 2. The plug halves 31 and 36 each have a rounded end 32 and 37 which has a depression 33 and 38 that each matches a keyed portion 25 on the customer specific tool 20. This locking mechanism 30 is actuated and locked by using the keyed portion 25 of the customer specific tool 20 inserted into the depressions 33, 38 located on rounded ends 32, 37 of the plug halves 31 and 36, and pushing in and rotating the plug half 31 until it hits the internal stop. The internal stop consists of a half circle groove 34 located on the innermost end of one plug half 31, and wraps approximately 30 degrees around the circumference of this plug half 31. A pin 35 located on the opposing plug half 36 extends perpendicularly from the centerline of the plug half 36 and extends out slightly past the basic diameter of the plug halves 31 and 36. The extended pin 35 is captured in the groove, 34 when either plug halves 31 or 36 are rotated to the lock position by the keyed portion 25 of the tool 20.

The second alternative locking mechanism 30 may be an individual assembly that will connect between two adjacent holes or may be a longer device that would spread the span from one pair of holes across the diameter of the linking unit 5 and center mounting unit 2 to another pair of holes. This locking mechanism 30 when inserted and placed into a locked position restricts the rotation of the adjacent units 5 and segments 2 and maintains the mechanical strength of the assembled units 5 and segments 2.

Figure 9:
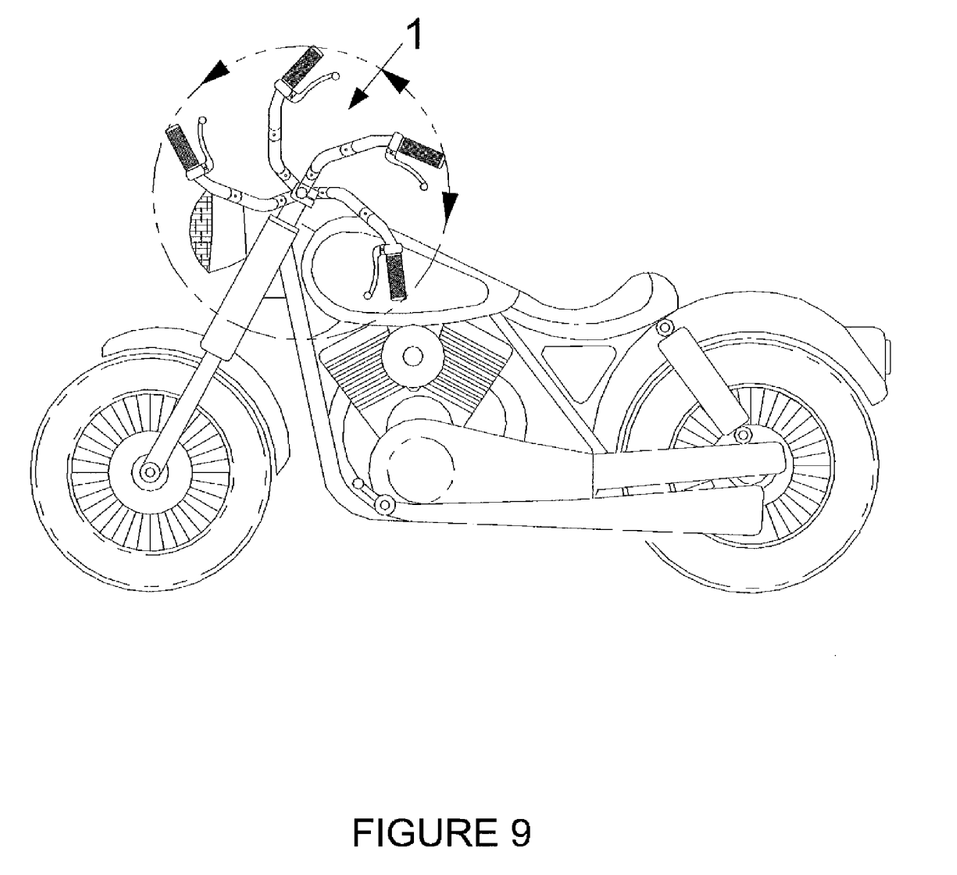
FIG. 9 is a side view of the present invention connected to a motorcycle and illustrating the degree to which the adjustable modular handlebar can be rotated.

FIG. 9 illustrates how the present invention may be rotated for security and/or anti-theft purposes. By allowing the center mounting segment 2 to be rotated either clockwise or counterclockwise until it is encountering an obstruction on the cycle or vehicle, the cycle is rendered essentially unable to steer, thus providing a security and/or anti-theft feature. Once the desired security position is acquired, the locking mechanism 40 would be actuated by using the customer specific tool 20.

Figure 10:
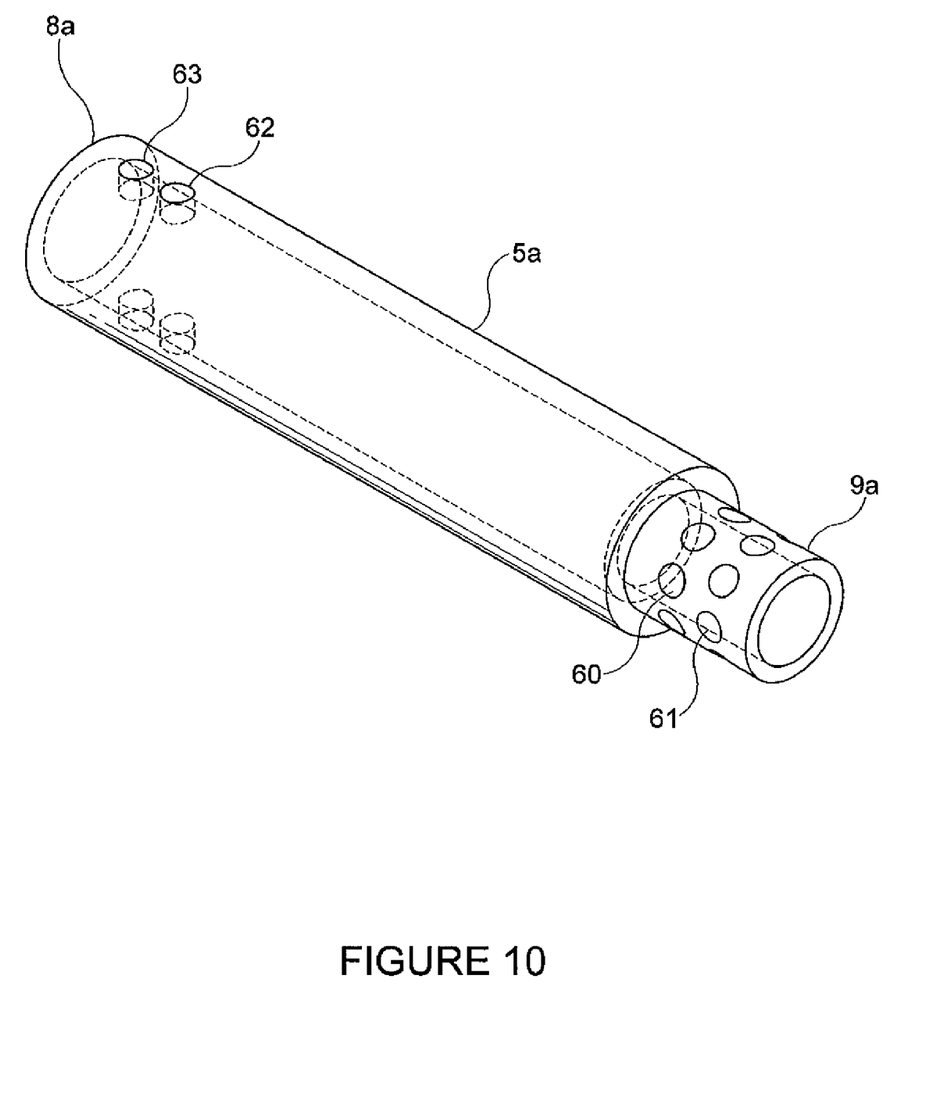
FIG. 10 is a perspective view of an alternative embodiment of the linking units.

In FIG. 10 an alternative embodiment of the linking units 5a is shown. Each linking unit 5a has a first female receiving end 8a and a second male insertion end 9a. Like the prior embodiment of linking units, the center mounting segment 2 and the adjacent linking units 5a are mated by inserting the male end 9a of one linking unit 5a into the female end 8a of another linking unit 5a or into the first of second end 3a, 3b of the center mounting segment 2. Each of the ends 8a, 9a, of the linking units 5a has a plurality of openings disposed about a central axis of the linking units.

The openings on the male ends 9a of the linking units 5a consist of a plurality of openings which form an outer and inner row of openings 61, 60, relative to the male end 9a of the linking unit 5a. These openings are situated so that the openings on the outer row 61 are offset from the openings located on the inner row 60, as is shown in FIG. 10. The number of openings located on the male end 9a of the linking units 5a can vary, but each opening has another opening located 180 degrees about the circumference from it.

The female end of the linking units 8a has a plurality of openings which form a front and rear opening 63, 62 relative to the female end 8a of the linking unit 5a. The front and rear opening 62, 63 of the female end 8a of the linking units 5a can be in any formation as long as they have another opening located 180 degrees about the circumference from it and they correspond to the location of the inner and outer row of openings 60, 61 on the male end 9a when adjoined with another linking unit 5a.

Figure 11:
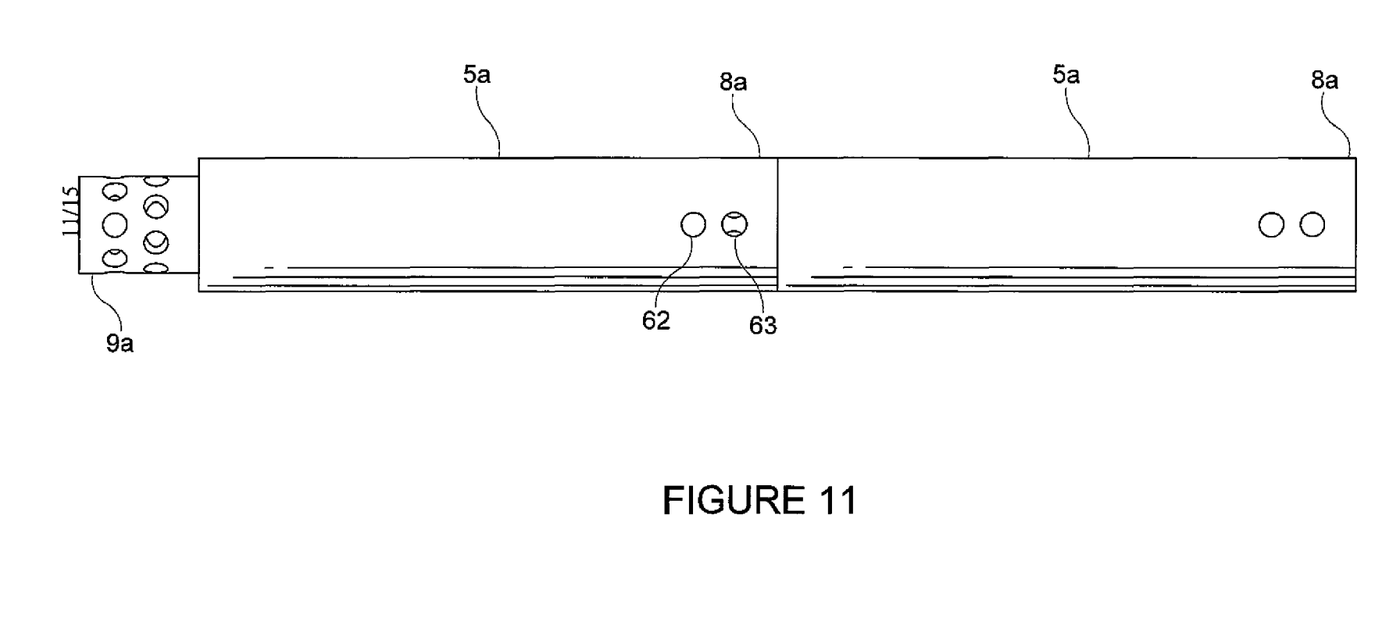
FIG. 11 is a plane view of two of the alternative embodiment of the linking units joined together.

FIG. 11 illustrates a front and rear opening 63, 62 being generally parallel to each other and corresponding to the location of the inner and outer row of openings 60, 61. As is shown in FIG. 11, when two linking units 5a are adjoined to each other, the male end 9a, which has a smaller circumference than the female end 8a, fits snugly within the female end 8a of the adjoining linking unit 5a. In this position, the front opening 63 on the female end 8a is positioned directly over the inner row of openings 61 of the male end 9a of the adjoining linking unit 5a. In this illustration, the openings are not aligned. Additionally, the rear openings 62 of the female ends 8a are positioned over the outer row of openings 61 on the male end 9a. In FIG. 11, these openings are aligned.

The offset nature of the inner and outer row of openings 60, 61 on the male end 8a of the linking unit allows for very minute adjustments to be made to the position of the linking units 5a relative to each other, which essentially allows a user to double the number of positions of adjustment available. The alternative embodiment of the linking units 5a may be comprised of a variety of shaped, lengths, curves and angles and assembled to create the desired handlebar shape for the user.

Figure 12:
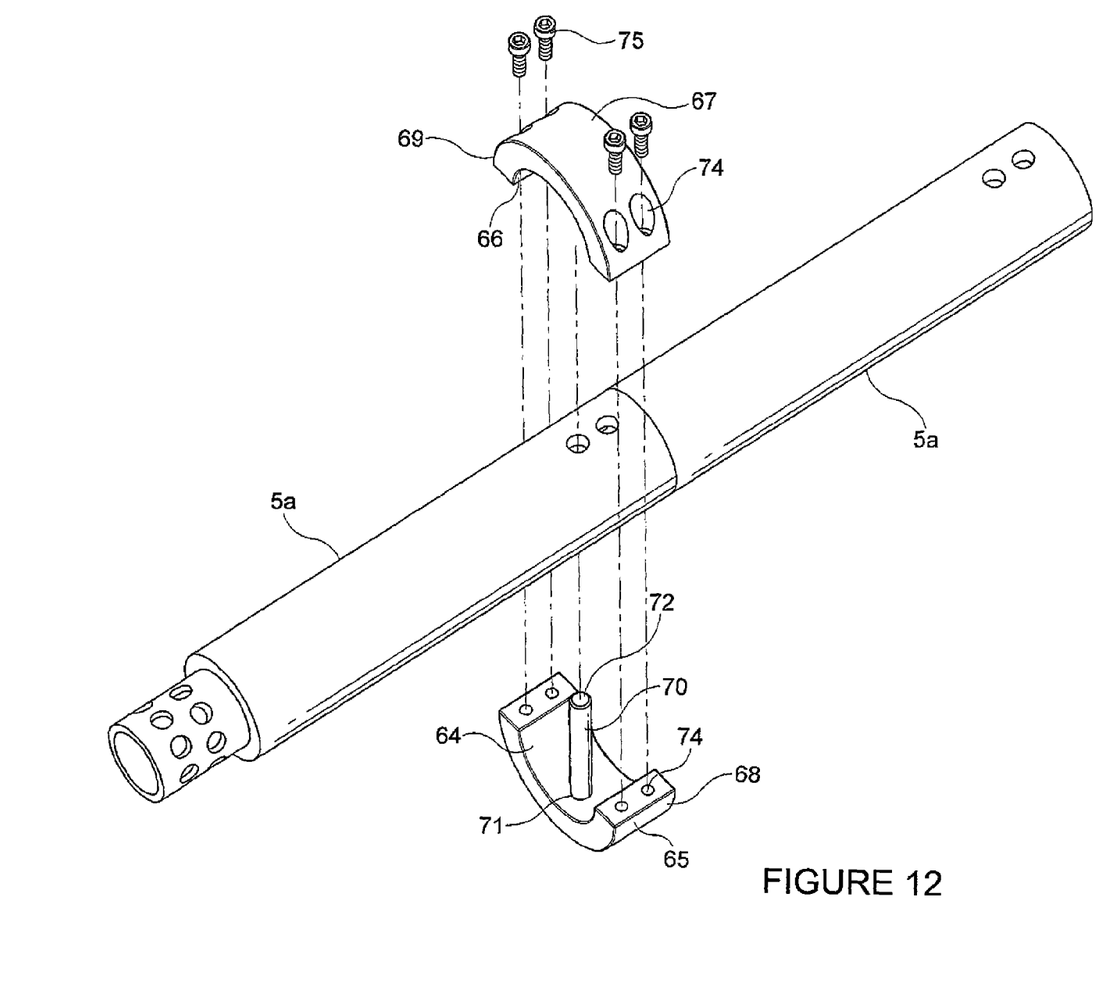
FIG. 12 is an exploded view of a third alternative embodiment of a locking mechanism.
Figure 13:
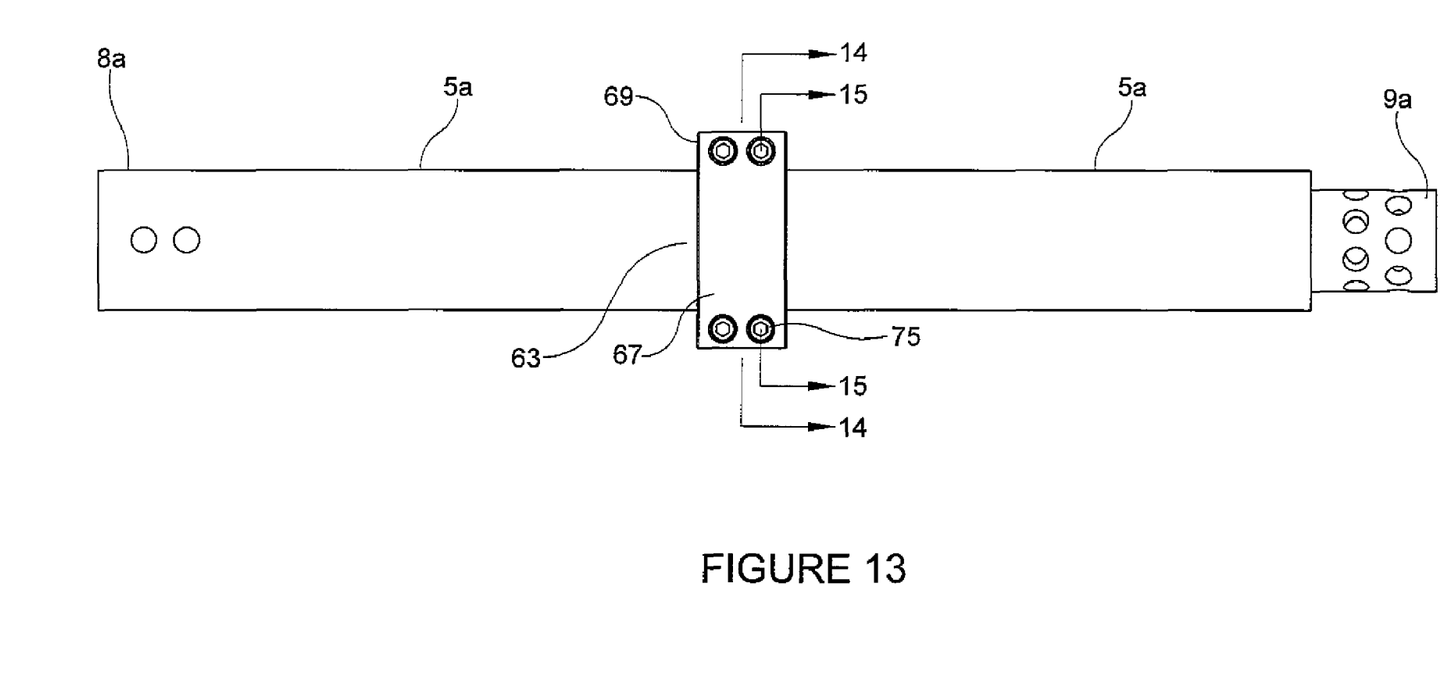
FIG. 13 is a plane view of the alternative embodiment of the linking units joined together by the third alternative embodiment of a locking mechanism.

Once two adjoining linking units 5a are assembled, a locking mechanism 40a is used to secure their position relative to each other. In FIG. 12 a third alternative embodiment of the locking mechanism 40a is shown and in FIG. 13 it is in use with two adjoined linking units 5a. The locking mechanism 40a shown in FIG. 12 is comprised of a clamping device having a first halve 68 and second halve 69. The first halve 68 has an inner 64 and outer surface 65. The inner surface 64 of the first halve has a pin 70 extending from it. The first end 71 of the pin 70 is connected to the inner surface 64 of the first halve of the clamping device 68 and the second end 72 of the pin 70 extends therefrom.

Figure 14:
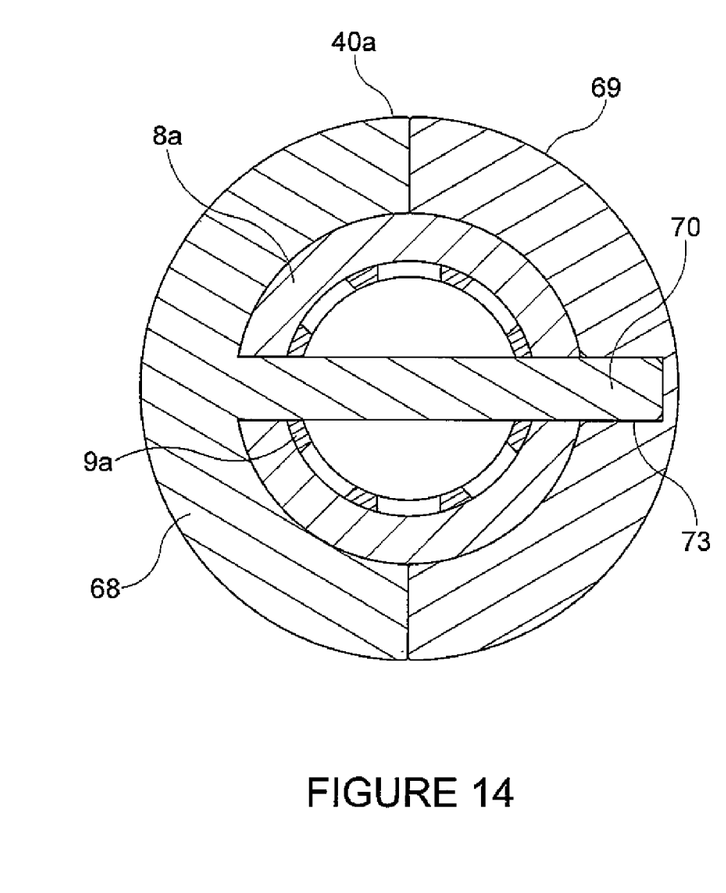
FIG. 14 is a sectioned plane view of the embodiment shown in FIG. 13.

In order to secure the adjoined linking units 5a together the pin 70 is inserted into the aligned openings of the two joined linking units 5a and extends completely through both the male and female 9a, 5a ends of the adjoining linking units 5a, as is shown in FIG. 14. The second halve 69 of the clamping device 40a is placed on the other side of the adjoined linking units 5a, so that the first and second halves of the clamping device 68,69 come together to completely encircle the joined linking units 5a.

The pin is positioned offset from the center of the inner surface 64 of the first halve of the clamping device. With this design, depending on which set of openings are aligned, the clamping device 40a will always cover the additional openings and the location where the two linking units 5*a* are joined. This assists in keeping water from entering into the joined linking units 5*a*.

The second halve 69 of the clamping device 40*a* also has an inner 66 and outer surface 67. The inner surface 66 of the second halve 69 has an indention 73 wherein the second end 72 of the pin 70 resides when the first and second halves 68,69 of the clamping device 40*a* are in use. This indention 73 is also offset from the center of the second halve 69 of the clamping device 40*a* so as to match the pin 70 extending from the inner surface 64 of the first halve 68.

Figure 15:
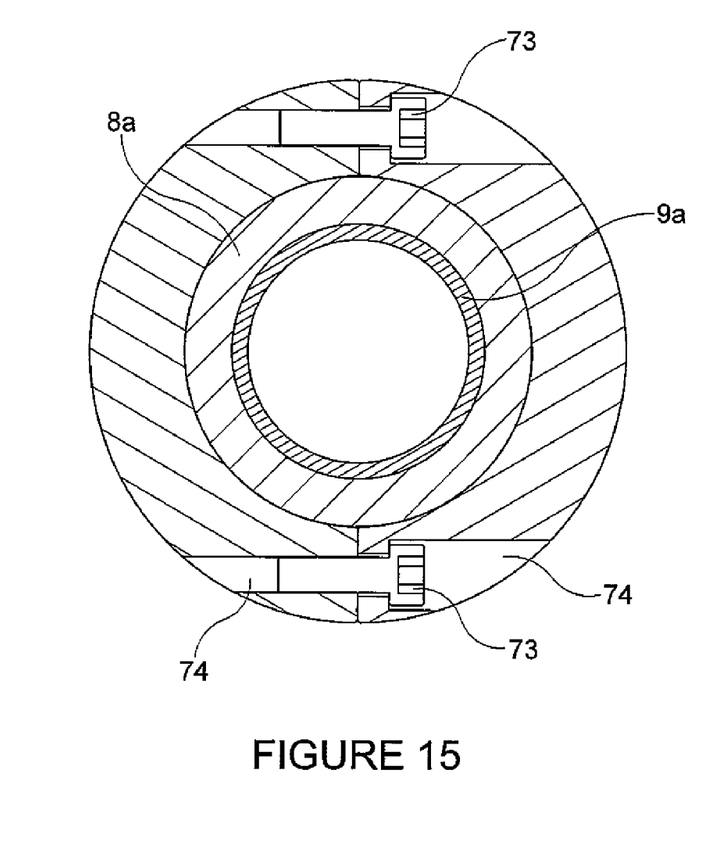
FIG. 15 is a sectioned plane view of the embodiment shown in FIG. 13.

To secure the clamping device 40*a*, the first and second halves 68, 69 of the clamping device 40*a* can be coupled together by a variety of means known throughout the industry. One such means is shown in FIGS. 12 and 15 which illustrate openings 74 on the outer surfaces 65, 67 of the first and second halves 68, 69 of the clamping device 40*a*. When the first and second halves 68, 69 encircle the adjoined linking units 5*a*, the openings 74 lay adjacent to each other and are able to receive securing devices, such as screws 75. The openings 74 can be threaded to further engage the screws 75. Other means and methods for securing two parts of a clamping device together which are known to those skilled in the art, may be utilized.

The foregoing detailed description is given primarily for clearness of understanding, and no unnecessary limitations are to be understood therefrom, for modifications will become obvious to those skilled in the art upon reading this disclosure and may be made without departing from the spirit of the invention and scope of the appended claims.

I claim:

1. An adjustable handlebar kit, comprising:
   a center mounting unit;
   a plurality of more than two linking units, each having a male receiving and female insertion end, said male end having a plurality of openings disposed about a central axis of said linking unit, and said openings forming an outer and inner row of openings;
   said female end having a plurality of openings disposed about a central axis of said linking unit, and said openings forming a front and rear opening positioned to align with both said outer and inner row of openings on said male end on an adjoining linking unit; and,
   a locking mechanism having a pin to maintain alignment of said openings of said female and said male ends of said adjoined linking units and said center mounting unit to said adjoined linking units.

2. The adjustable handlebar kit of claim 1 wherein, said openings on said inner row on said male end of said linking unit are disposed between said openings on said outer row of said male end.

3. The adjustable handlebar kit of claim 1 wherein said front openings on said female end of said linking units are generally parallel with said rear openings of said female end.

4. The adjustable handlebar kit of claim 1 wherein said locking mechanism comprises a
   clamping device having a first and second halve, said first and second halves each having an inner and outer surface and said inner surface of said first halve having a pin extending therefrom.

5. The adjustable handlebar kit of claim 4 wherein said first and second halves of said clamping device further comprises a means to secure said halves together on said outer surface of said halves.

6. A adjustable handlebar kit for retrofit into a motorcycle handlebar, in combination with a motorcycle handlebar, the combination comprising:
   a center mounting unit of a motorcycle handlebar;
   a plurality of more than two linking units, each having a male receiving and female insertion end, said male end having a plurality of openings disposed about a central axis of said linking unit, and said openings forming an outer and inner row of openings and wherein said openings on said inner row on said male end of said linking unit are disposed between said openings on said outer row of said male end;
   said female end having a plurality of openings and said openings forming a front and rear opening and positioned to align with both said outer and inner row of openings on said male end; and
   a locking mechanism having a pin to maintain alignment of said openings of said female and said male ends of said adjoined linking units and said center mounting unit to said adjoining linking units.

* * * * *